(12) United States Patent
Koenig et al.

(10) Patent No.: US 9,436,385 B2
(45) Date of Patent: Sep. 6, 2016

(54) INVOCATION CONTROL OVER KEYBOARD USER INTERFACE

(71) Applicant: Microsoft Corporation, Redmond, WA (US)

(72) Inventors: Kimberly Koenig, Redmond, WA (US); Weston Thayer, Seattle, WA (US); Shiraz Somji, Bellevue, WA (US); Ruth Kikin-Gil, Bellevue, WA (US); Christopher Jon Rinker, Seattle, WA (US); Ravi Pinjala, Bellevue, WA (US); Ivor Berry, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 199 days.

(21) Appl. No.: 14/146,720

(22) Filed: Jan. 2, 2014

(65) Prior Publication Data

US 2015/0169219 A1    Jun. 18, 2015

Related U.S. Application Data

(60) Provisional application No. 61/916,738, filed on Dec. 16, 2013.

(51) Int. Cl.
*G06F 3/048* (2013.01)
*G06F 3/0488* (2013.01)
(Continued)

(52) U.S. Cl.
CPC ......... *G06F 3/04886* (2013.01); *G06F 3/0481* (2013.01); *G06F 3/0484* (2013.01);
(Continued)

(58) Field of Classification Search
CPC ........... G06F 3/04886; G06F 3/04883; G06F 3/0236; G06F 3/0238; G06F 3/0481; G06F 9/4446; G06F 3/04895; G06F 3/041; G06F 3/0488; G06F 3/0416; G06F 3/038; G06F 3/0231
USPC ................................ 715/773; 345/156, 173
See application file for complete search history.

(56) References Cited

U.S. PATENT DOCUMENTS 5,666,552 A    9/1997   Greyson et al.
8,547,354 B2   10/2013  Koch et al.
(Continued)

FOREIGN PATENT DOCUMENTS

EP    2312427 A2    4/2011
EP    2667288 A1    11/2013

OTHER PUBLICATIONS

"International Search Report and Written Opinion Issued in PCT Application No. PCT/US2014/069417", Mailed Date: Mar. 17, 2015, 10 Pages.
(Continued)

*Primary Examiner* — Tadeese Hailu
(74) *Attorney, Agent, or Firm* — Jessica Meyers; Jim Ross; Micky Minhas

(57) ABSTRACT

A touch-based device provides invocation control over a keyboard user interface (UI). The device displays a keyboard UI overlaid on an application UI to allow a user to interact with the application UI. A dismissal UI is displayed adjacent to the keyboard UI to allow the user to dismiss the keyboard UI. The keyboard UI is dismissed in response to detecting a user action on the dismissal UI. The device presents a lock UI and an invocation UI adjacent to the lock UI. In response to detecting another user action on the lock UI, the user is prevented from invoking the keyboard UI.

19 Claims, 7 Drawing Sheets

(51) Int. Cl.
*G06F 3/0481* (2013.01)
*G06F 3/0484* (2013.01)
*G06F 17/21* (2006.01)
*G06F 17/24* (2006.01)

(52) U.S. Cl.
CPC ........ *G06F3/0488* (2013.01); *G06F 3/04817* (2013.01); *G06F 3/04842* (2013.01); *G06F 17/211* (2013.01); *G06F 17/212* (2013.01); *G06F 17/24* (2013.01); *G06F 17/245* (2013.01)

(56) References Cited

U.S. PATENT DOCUMENTS

| | | | |
|---|---|---|---|
| 8,952,912 B1 | 2/2015 | Hock | |
| 2004/0239691 A1 | 12/2004 | Sprang et al. | |
| 2005/0114778 A1* | 5/2005 | Branson | G06F 9/4446 715/711 |
| 2006/0064640 A1 | 3/2006 | Forlines et al. | |
| 2008/0052290 A1* | 2/2008 | Kahn | G06F 17/30171 |
| 2008/0059898 A1 | 3/2008 | Deggelmann et al. | |
| 2008/0119237 A1* | 5/2008 | Kim | G06F 3/0481 455/566 |
| 2009/0125850 A1* | 5/2009 | Karstens | G06F 3/0481 715/866 |
| 2009/0228842 A1 | 9/2009 | Westerman et al. | |
| 2009/0260010 A1* | 10/2009 | Burkhart | G06F 9/4443 718/100 |
| 2010/0306702 A1* | 12/2010 | Warner | G06F 3/0482 715/811 |
| 2011/0088086 A1 | 4/2011 | Swink et al. | |
| 2011/0161479 A1 | 6/2011 | Freishtat et al. | |
| 2011/0167375 A1* | 7/2011 | Kocienda | G06F 1/3203 715/773 |
| 2012/0096376 A1 | 4/2012 | Hibi | |
| 2012/0272144 A1 | 10/2012 | Radakovitz et al. | |
| 2013/0005471 A1* | 1/2013 | Chung | A63F 13/12 463/42 |
| 2013/0109426 A1* | 5/2013 | Kerger | H04L 65/4061 455/518 |
| 2013/0191781 A1 | 7/2013 | Radakovitz et al. | |
| 2013/0212470 A1 | 8/2013 | Karunamuni et al. | |
| 2013/0232403 A1 | 9/2013 | Abrahami | |
| 2014/0253461 A1* | 9/2014 | Hicks | G06F 1/3215 345/173 |
| 2014/0268199 A1 | 9/2014 | Barber et al. | |
| 2014/0359448 A1 | 12/2014 | Paulus et al. | |

OTHER PUBLICATIONS

"On-Screen Keyboard and Numeric Keypad", Published on: Nov. 14, 2011, Available at: http://msdn.microsoft.com/en-us/library/ff727766.aspx.

George, "How to Adjust the Touch Keyboard for Use with Word 2013: Creating a Touch Keyboard Toggle Switch", Published on: Mar. 29, 2013, Available at: http://random.georgeliu.me/post/2013/03/29/How-to-Adjust-the-Touch-Keyboard-for-Use-with-Word-2013%3A-Creating-a-Touch-Keyboard-Toggle-Switch.

"How to Use the On-Screen Keyboard", Retrieved on: Oct. 10, 2013, Available at: http://www.microsoft.com/surface/en-us/support/touch-mouse-and-search/how-to-use-the-on-screen-keyboard.

Wylie, Jonathan, "How to become an iPad Keyboard Ninja!", Published on: Jul. 22, 2013, Available at: http://jonathanwylie.com/2013/07/22/how-to-become-an-ipad-keyboard-ninja-the-education-edition/.

"The Touch Keyboard", Published on: Feb. 2, 2012, Available at: http://msdn.microsoft.com/en-us/library/windows/apps/hh465404.aspx#invocation_and_dismissal_logic.

Gookin, Dan, "How to Use the Samsung Galaxy Tab Onscreen Keyboard", Published on: Apr. 19, 2012, Available at: http://www.dummies.com/how-to/content/how-to-use-the-samsung-galaxy-tab-onscreen-keyboar.html.

"Office Touch Guide", Retrieved on: Oct. 10, 2013, Available at: http://office.microsoft.com/en-001/support/office-touch-guide-HA102823845.aspx.

"International Preliminary Report on Patentability Issued in PCT Application No. PCT/US2014/069417", Mailed Date: Nov. 25, 2015, 7 Pages.

"Second Written Opinion Issued in PCT Application No. PCT/US2014/069417", Mailed Date: Sep. 8, 2015, 6 Pages.

\* cited by examiner

INVOCATION CONTROL OVER KEYBOARD USER INTERFACE

PRIORITY CLAIM

This application claims priority to U.S. Provisional Patent Application Ser. No. 61/916,738 filed on Dec. 16, 2013. The disclosures of the foregoing provisional patent application are hereby incorporated by reference for all purposes.

BACKGROUND

A contemporary touch-based device provides a user with a virtual (soft) keyboard for onscreen text entry when a hardware keyboard is not connected to the device. A soft keyboard is typically invoked when the user taps and places text insertion point (IP) in an editable text area. The soft keyboard is also invoked when a user double taps and selects a word in an editable text area. The soft keyboard is further invoked when a user performs an action (such as inserting a new comment) where a document processing application automatically places the user's IP in an editable text area. These behaviors may be governed by the operating system and change as operating systems are updated/modified.

In a document processing application, keyboard invocation occurs frequently regardless of whether text entry is not the user's primary goal. Significant portion of an available onscreen area in a touch-based device is an editable document canvas. Users place an IP or select a word to create or expand a selection, insert an object (like an image, shape, or table), format text (different font face, style, or color; bold/italic/underline, etc.), move a selection with cut/copy/paste, and move the selection with touch. In addition, the user is more likely to make high-level tweaks (document formatting, structure) on touch devices, versus long-form authoring. Text entry is likely be a few sentences or less at a time.

Repeated keyboard invocation may be frustrating, interruptive, and unwanted when the user does not actually intend to type on a touch-based device. Accidental invocation is also common. Examples include panning the canvas up or down which results in unintentional IP placement. Unwanted invocation forces the user to repeatedly dismiss the keyboard, which degrades user experience and satisfaction with products because the keyboard occludes significant portion of the screen in landscape mode.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to invocation control over a keyboard user interface (UI). A touch-based device may display the keyboard UI overlaid on an application UI to allow a user to interact with the application UI. The touch-based device may display a dismissal UI adjacent to the keyboard UI to allow the user to dismiss the keyboard UI. In response to detecting a user action on the dismissal UI, the touch-based device may dismiss the keyboard. The touch-based device may also present a lock UI and an invocation UI adjacent to the lock UI. In response to detecting another user action on the lock UI, the touch-based device may lock the user from invoking the keyboard UI, dismiss the lock UI and the invocation UI, and display an invocation indicator and an unlock UI adjacent to the invocation indicator.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1:
FIG. 1 is a conceptual diagram illustrating dismissal control over a keyboard user interface (UI), according to embodiments.

As briefly described above, invocation control over a keyboard user interface (UI) may be provided. The keyboard UI may be displayed overlaid on an application UI to allow a user to interact with the application UI. A dismissal UI may be displayed adjacent to the keyboard UI to allow the user to dismiss the keyboard UI. In response to detecting a user action on the dismissal UI, the keyboard UI may be dismissed. A lock UI and an invocation UI adjacent to the lock UI may be presented. In response to detecting another user action on the lock UI, the user may be locked from invoking the keyboard UI, the lock UI and the invocation UI may be dismissed, and an invocation indicator and an unlock UI adjacent to the invocation indicator may be displayed.

In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a computing device, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multi-processor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium is a computer-readable memory device. The computer-readable storage medium can for example be implemented via one or more of a volatile computer memory, a non-volatile memory, a hard drive, and a flash drive.

Throughout this specification, the term "platform" may be a combination of software and hardware components to provide invocation control over a keyboard UI. Examples of platforms include, but are not limited to, a hosted service executed over a plurality of servers, an application executed on a single computing device, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example embodiments may be found in the following description.

FIG. 1 is a conceptual diagram illustrating invocation control over a keyboard user interface (UI), according to embodiments.

As shown in diagram 100, a touch-based device 102 may present content to a user 106. The touch-based device 102 may include variety of touch enabled devices including but not exclusive to a tablet device, a smart phone, a touch capable notebook, a touch capable monitor, and similar ones. The touch-based device 102 may detect a touch action such as a swipe, a pinch, a spread, a tap, a tap and hold, and similar ones as an interaction. The touch action on the touch-based device 102 may be referred to as a gesture. The touch-based device 102 may execute operation(s) corresponding to the gesture to allow the user 106 to interact with the displayed content. Displayed content may include variety of internal or external data. The data may include text, graphics, video, audio, combinations of each and similar ones. The device 102 may retrieve displayed content from an external device such as server 104. An example may include the device 102 retrieving content such as a web page from an external resource such as the server 104 and displaying the web page to the user 106.

According to some embodiments, the touch-based device 102 may display a variety of keyboard UI states and UIs to control the keyboard UI states. In an example scenario, the touch-based device 102 may display a keyboard UI to enable the user 106 to interact with the displayed content. The touch-based device 102 may also display a dismissal UI 108 to enable the user 106 to dismiss the keyboard UI. The user may activate the dismissal UI 108 with a gesture 110. The device 102 may dismiss the keyboard UI in response to activation of the dismissal UI 108.

While the example system in FIG. 1 has been described with specific components including a touch-based device 102 providing invocation control over a keyboard UI, embodiments are not limited to these components or system configurations and can be implemented with other system configuration employing fewer or additional components. In an alternate example, the touch-based device 102 may lock the keyboard UI to prevent the user 106 from invoking the keyboard UI. The approaches discussed here may be applied to any compliance process provided by an application and/or a server using the principles described herein.

Figure 2:
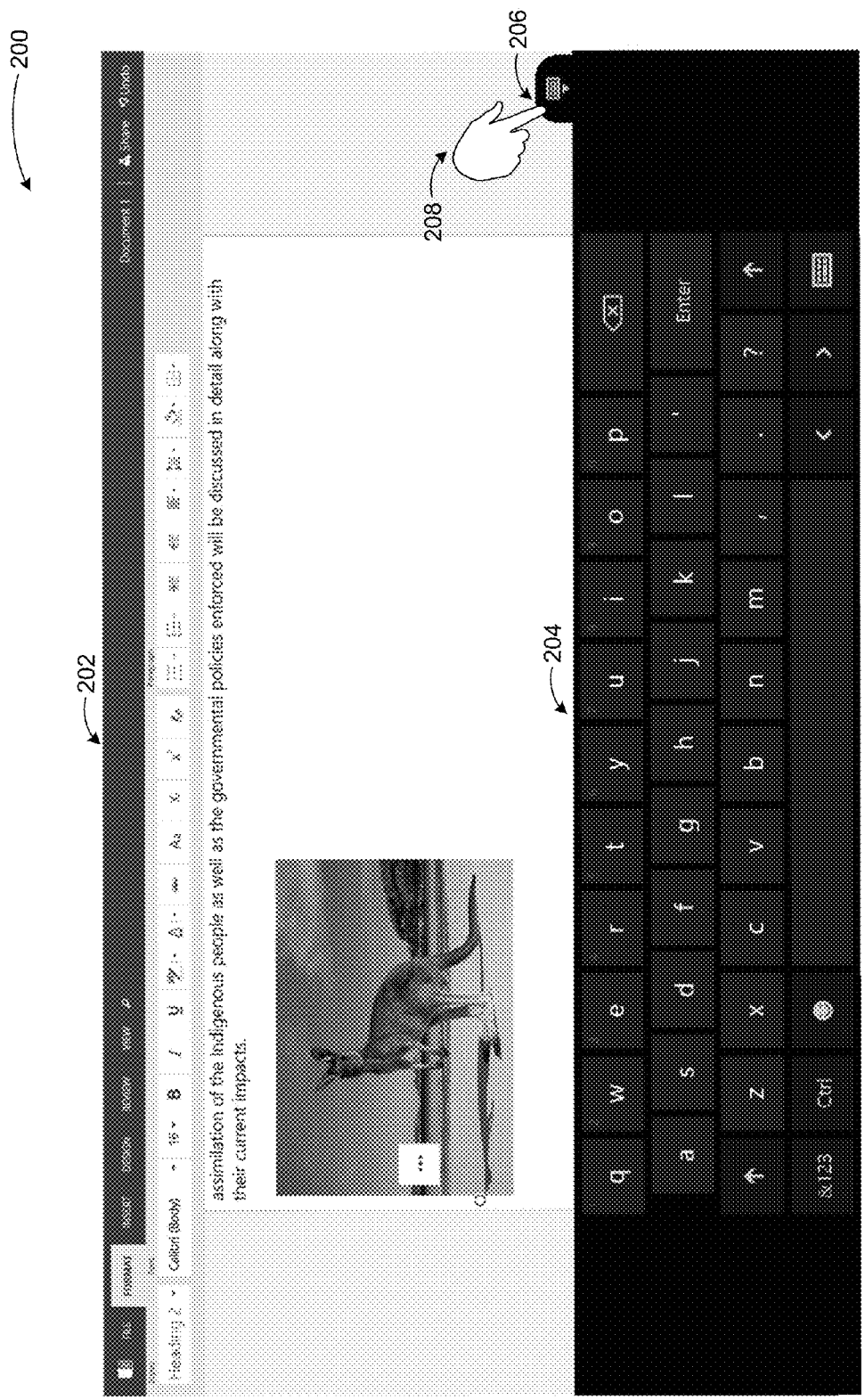
FIG. 2 is an example diagram illustrating dismissal UI components of a scheme to provide dismissal control over a keyboard UI, according to embodiments.

FIG. 2 is an example diagram illustrating dismissal UI components of a scheme to provide invocation control over a keyboard UI, according to embodiments. Diagram 200 illustrates a keyboard UI 204 which may be dismissed through a dismissal UI 206.

A touch-based device may display an application UI 202 providing content to a user. The content may include data such as text, graphics, and similar ones. The application UI may include a UI of document processing application, a drawing application, a spreadsheet application, a presentation application, and similar ones. A user may be allowed to interact with the content through the keyboard UI 204. In an example scenario, the keyboard UI 204 may automatically be activated in response to a touch action in a region of the application UI 202 configured to accept text entry.

The dismissal UI 206 may be placed adjacent to a top edge of the keyboard UI 204. A right edge of the dismissal UI 206 may be placed in line with a right edge of the keyboard UI. The dismissal UI 206 may also be incorporated into the keyboard UI itself, instead of being placed adjacent to the keyboard UI edge. A touch action such as a tap action 208 may activate the dismissal UI 206. In response to detecting the tap action 208, the touch-based device may execute operations to dismiss the keyboard UI 204.

The operations may include hiding the keyboard UI 204, deactivating the keyboard UI 204, removing the keyboard UI 204, or similar ones. The touch-based device may display an invocation UI and a lock UI to allow the user to control a status of the keyboard UI 204.

Figure 3:
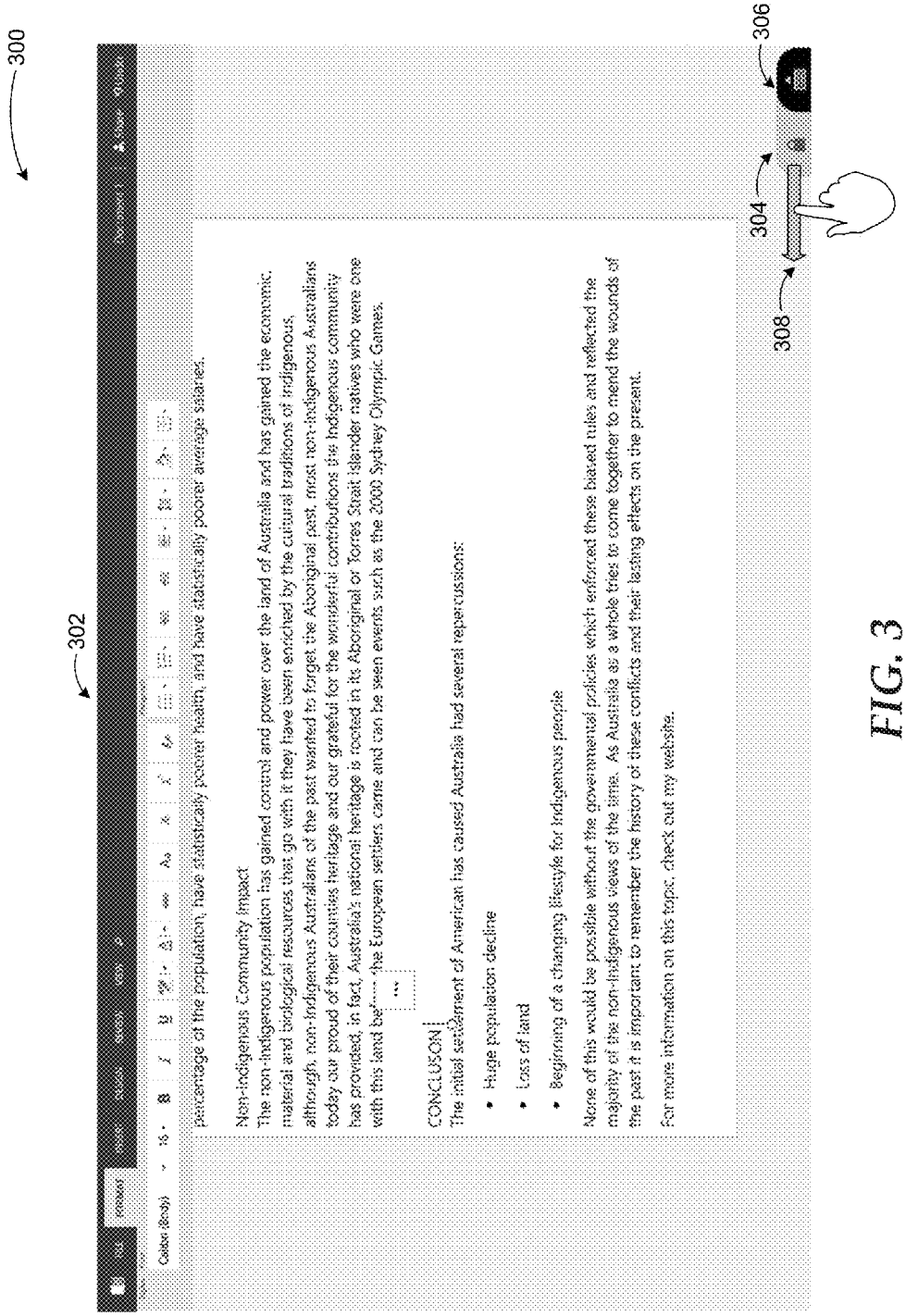
FIG. 3 is another example diagram illustrating lock UI components and invocation UI components of a scheme to provide invocation and lock control over a keyboard UI, according to embodiments.

FIG. 3 is another example diagram illustrating lock UI components and invocation UI components of a scheme to provide invocation control over a keyboard UI, according to embodiments.

As shown in the diagram 300, in response to a dismissal of the keyboard UI, a touch-based device may display a lock UI 304 and an invocation UI 306. Subsequent to the dismissal of the keyboard UI, the keyboard UI may be placed in an unlocked state allowing the user to invoke the keyboard UI to interact with a content displayed by an application UI 302. The keyboard UI may be invoked in response to a user action associated with the application UI 302 such as a touch action in an area of the application UI configured to edit text. Alternatively, the keyboard UI may be invoked by a user action on the invocation UI 306. A user action such as tap action on the invocation UI 306 may initiate execution of operation(s) to invoke the keyboard UI.

In response to detecting a gesture on the invocation UI 306, the touch-based device may execute the operation(s) associated with invoking the keyboard UI to allow the user to interact with the content displayed by the application UI 302. The gesture associated with activating the invocation UI 306 may not be limited to tap action. User actions such as a swipe action associated with the invocation UI 306 may be interpreted by the touch-based device to activate the invocation UI 306.

According to some embodiments, the unlocked status of the keyboard UI allowing the user to invoke the keyboard UI may be changed by activating the lock UI 304. In response to activation of the lock UI 304 by touch action such as a swipe action 308, the unlocked status of the keyboard UI may be changed to a locked status. The lock status may prevent the user from invoking the keyboard UI. The lock status may encompass the application UI 302 or a desktop UI of the touch-based device preventing the user from invoking the keyboard UI in other application UIs. The lock UI 304 may be slid with the swipe action in a left direction. The lock UI 304 may be slid back to an original position upon activation of the lock status. The lock UI 304 and the invocation UI 306 may be replaced by invocation indicator and an unlock UI in response to activation of the lock status. In addition, activation of the lock UI 304 is not limited to a swipe action. The lock UI 304 may be activated by other touch actions such as a tap action and similar ones.

Figure 4:
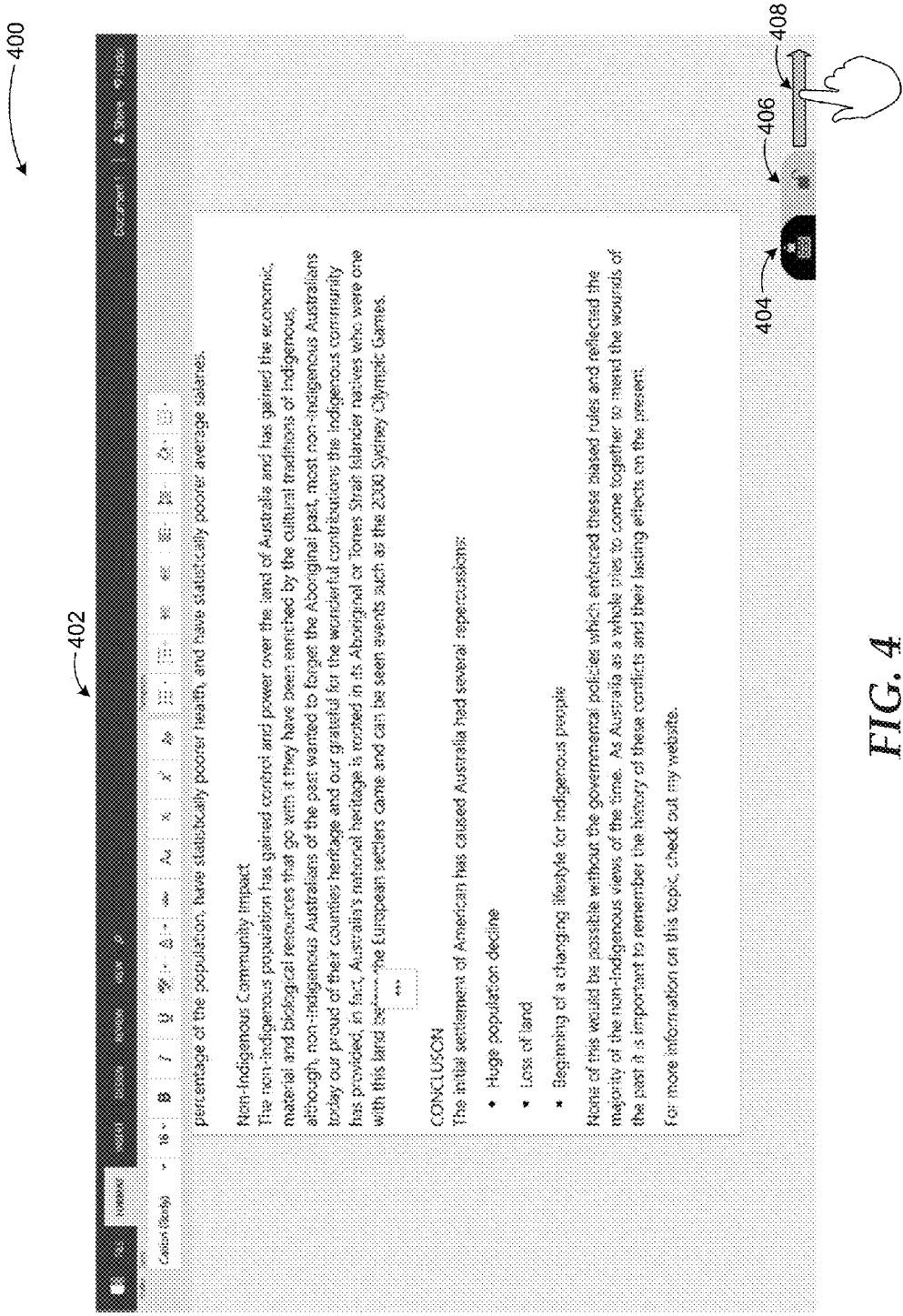
FIG. 4 is another example diagram illustrating unlock UI components of a scheme to provide invocation and unlock control over a keyboard UI, according to embodiments.

FIG. 4 is another example diagram illustrating unlock UI components of a scheme to provide invocation control over a keyboard UI, according to embodiments.

As shown in diagram 400, an invocation indicator 404 may display a graphic alerting a user to a locked status of the keyboard UI preventing the user from interacting with the application UI 402 using the keyboard UI. When the keyboard UI is in the locked status, a user may be prevented from invoking the keyboard UI through a user action such as tap action on an editable area of the application UI. The user may be enabled to unlock the keyboard UI by a user action on unlock UI 406. The user action may include a right swipe action 408 to slide the unlock UI to the right, a tap action on the unlock UI 406, and similar ones. In response to activation of the unlock UI 406 and unlocking the keyboard UI, the touch-based device may remove the invocation indicator 404 and unlock UI 406 and display the lock UI and invocation UI to allow the user to re-lock the keyboard UI or to invoke the keyboard UI.

According to some embodiments, the dismissal UI, the invocation UI, the lock UI, and the unlock UI may be provided through an application programming interface (API). The invocation UI may be activated by a user action such as an upward swipe action starting on the invocation UI. The dismissal UI may be activated by a user action such as a downward swipe starting on the dismissal UI. Locations of the lock and the invocation UIs may be swapped to enable the lock UI to be activated with a rightward swipe action sliding the lock UI to the right. Locations of the unlock UI and the invocation indicator may be swapped to enable the unlock UI to be activated with a leftward swipe action sliding the unlock UI to the left. In addition, the lock UI and the invocation UI pair and the invocation indicator and the unlock UI pair may be placed in proximity to a bottom right corner of the touch-based device's UI (desktop UI) or the application UI 402.

According to further embodiments, the lock button may be a single button placed adjacent to the invocation button. Tapping the lock button may lock the keyboard. Another tap may unlock the keyboard. The lock, invocation, and dismissal UIs may be animated. Moreover, the lock, invocation, and dismissal UIs may display callouts or tooltips to the user to help them learn to use the UIs.

According to other embodiments, the invocation UI may be disabled. The user may be allowed to invoke the keyboard UI by interacting with editable areas of the application UI. The lock UI and the unlock UI 406 may be displayed to allow the user to change a lock status and an unlock status of the keyboard UI. In addition, the touch-based device may display a button control in place of a dismissal UI, a lock UI and an invocation UI pair and an invocation indicator and unlock UI pair to provide invocation, lock, and unlock functionality. A graphic associated with the button control may be changed to reflect the locked or unlocked status of the keyboard UI. Similar to a button control, a pin and unpin control, and an enable and a disable control, and an on and an off control, and a show and hide control may be used to enable lock and unlocked status of the keyboard UI.

According to yet other embodiments, the dismissal, invocation, lock, and unlock UIs may be disabled in response to detecting a device displaying the application UI 402 that is not touch enabled. Furthermore, in response to detecting an attachment of a mouse device and a movement of the mouse device, the dismissal, invocation, lock, and unlock UIs may be disabled. In addition, in response to detecting a read-only content displayed on the application UI 402 by the touch-based device, the dismissal, invocation, lock, and unlock UIs may be disabled. Moreover, the touch-based device may detect a predetermined number of consequent activations of the dismissal UI. The touch-based device may provide a notification describing the lock UI and the unlock UI to encourage the user to activate the lock and the unlock UI.

The example scenarios and schemas in FIG. 2 through 4 are shown with specific components, data types, and configurations. Embodiments are not limited to systems according to these example configurations. Invocation control over a keyboard UI may be implemented in configurations employing fewer or additional components in applications and user interfaces. Furthermore, the example schema and components shown in FIG. 2 through 4 and their subcomponents may be implemented in a similar manner with other values using the principles described herein.

Figure 5:
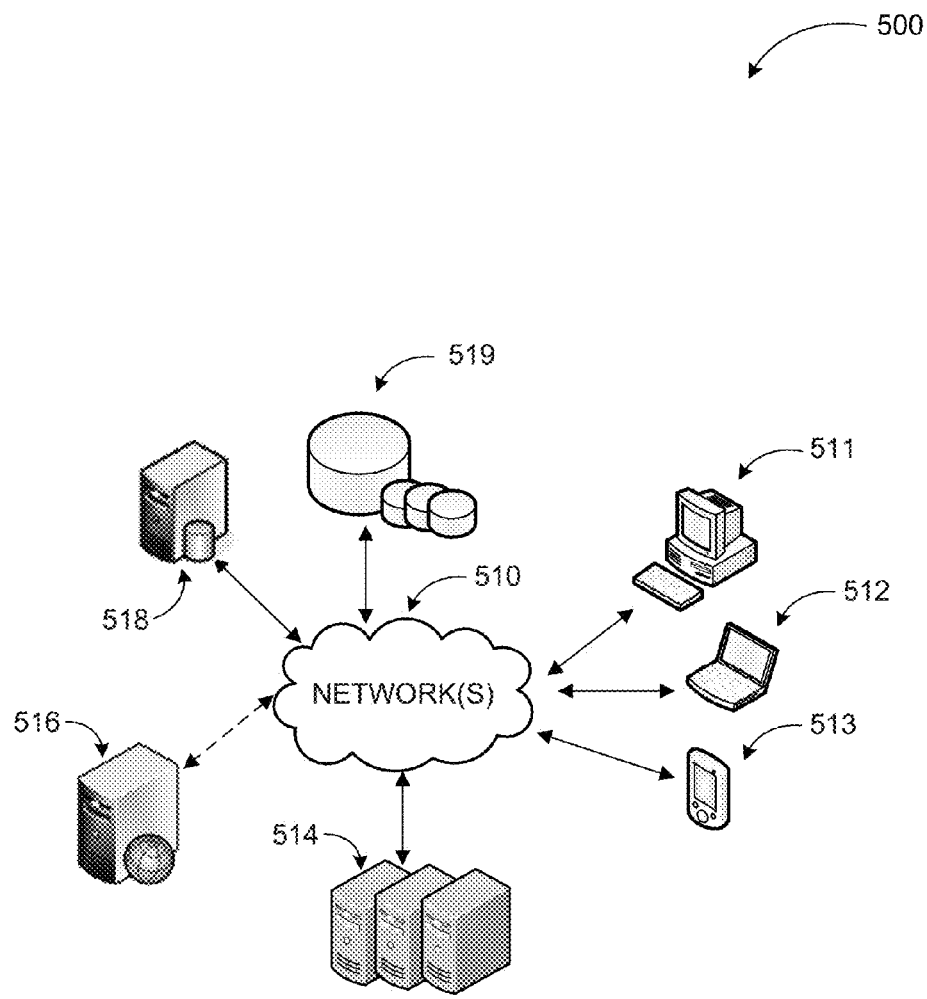
FIG. 5 is a simplified networked environment, where a system according to embodiments may be implemented.

FIG. 5 is an example networked environment, where embodiments may be implemented. A system providing invocation control over a keyboard UI may be implemented via software executed over one or more servers 514 such as a hosted service. The platform may communicate with client applications on individual computing devices such as a smart phone 513, a laptop computer 512, or desktop computer 511 ('client devices') through network(s) 510.

Client applications executed on any of the client devices 511-513 may facilitate communications via application(s) executed by servers 514, or on individual server 516. A dismissal UI may be displayed adjacent to a keyboard UI to allow a user to dismiss a keyboard UI. In response to detecting a user action on the dismissal UI, the keyboard UI may be dismissed. A lock UI and an invocation UI adjacent to the lock UI may be presented. In response to detecting another user action on the lock UI, the user may be locked from invoking the keyboard UI, the lock UI and the invocation UI may be dismissed, and an invocation indicator and an unlock UI adjacent to the invocation indicator may be displayed. An API providing the dismissal, invocation, lock, and unlock UIs may be stored in data store(s) 519 directly or through database server 518.

Network(s) 510 may comprise any topology of servers, clients, Internet service providers, and communication media. A system according to embodiments may have a static or dynamic topology. Network(s) 510 may include secure networks such as an enterprise network, an unsecure network such as a wireless open network, or the Internet. Network(s) 510 may also coordinate communication over other networks such as Public Switched Telephone Network (PSTN) or cellular networks. Furthermore, network(s) 510 may include short-range wireless networks such as Bluetooth or similar ones. Network(s) 510 provide communication between the nodes described herein. By way of example, and not limitation, network(s) 510 may include wireless media such as acoustic, RF, infrared and other wireless media.

Many other configurations of computing devices, applications, data sources, and data distribution systems may be employed to provide invocation control over a keyboard UI. Furthermore, the networked environments discussed in FIG. 5 are for illustration purposes only. Embodiments are not limited to the example applications, modules, or processes.

Figure 6:
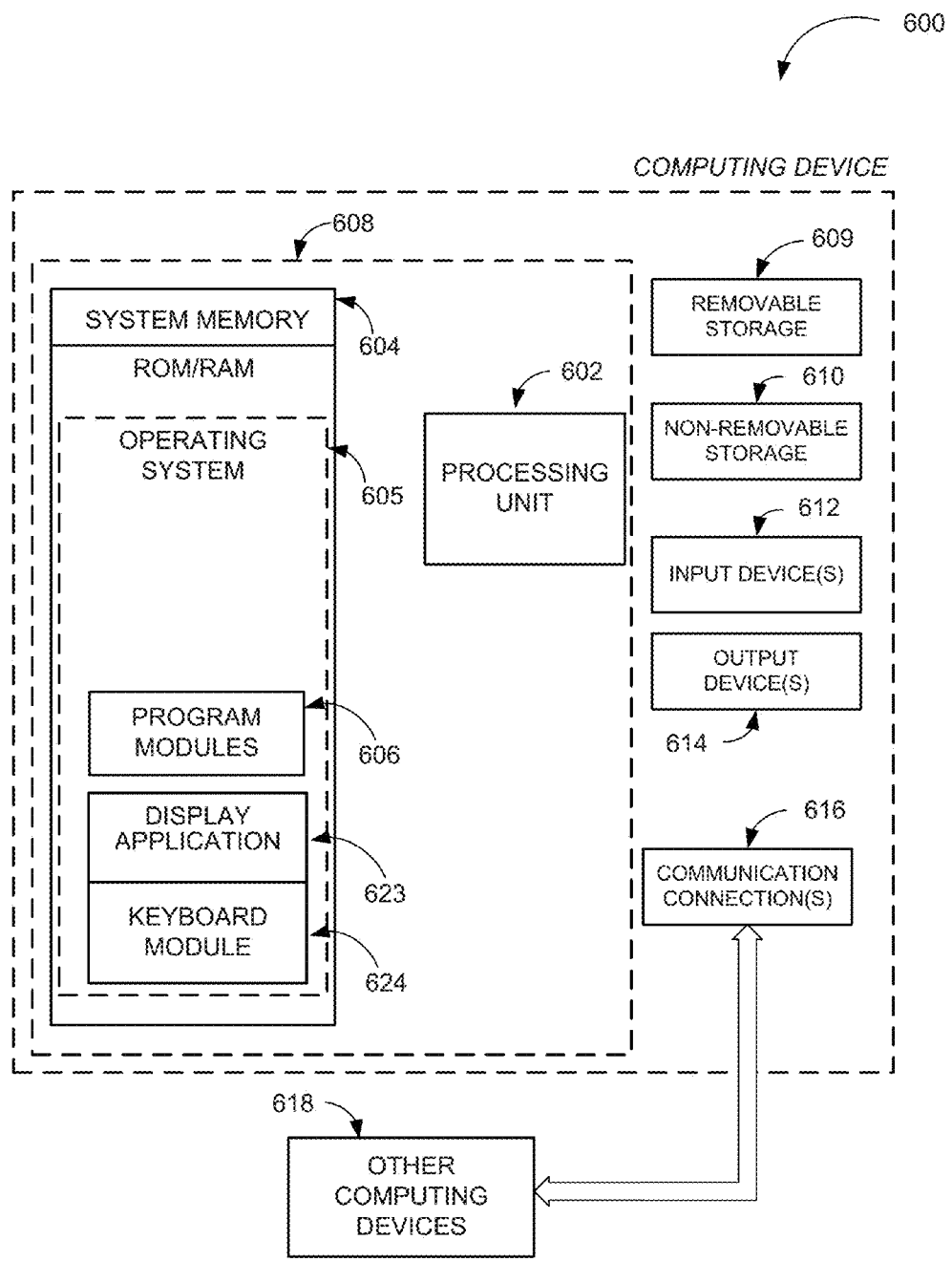
FIG. 6 is a block diagram of an example computing operating environment, where embodiments may be implemented.

FIG. 6 and the associated discussion are intended to provide a brief, general description of a suitable computing environment in which embodiments may be implemented. With reference to FIG. 6, a block diagram of an example computing operating environment for an application according to embodiments is illustrated, such as computing device 600. In a basic configuration, computing device 600 may be any computing device executing an application according to embodiments and include at least one processing unit 602 and system memory 604. Computing device 600 may also include a plurality of processing units that cooperate in executing programs. Depending on the exact configuration and type of computing device, the system memory 604 may be volatile (such as RAM), non-volatile (such as ROM, flash memory, etc.) or some combination of the two. System memory 604 typically includes an operating system 605 suitable for controlling the operation of the platform, such as the WINDOWS® operating systems from MICROSOFT CORPORATION of Redmond, Wash. The system memory 604 may also include one or more software applications such as program modules 606, an application 622, and a keyboard module 624.

The application 622 may invoke an API providing dismissal, invocation, lock, and unlock UIs to manage a keyboard UI. The keyboard module 624 may execute operations associated with an activated UI from the dismissal, invocation, lock, and unlock UIs to dismiss the keyboard UI, invoke the keyboard UI, lock invocation, or unlock invocation of the keyboard UI. This basic configuration is illustrated in FIG. 6 by those components within dashed line 608.

Computing device 600 may have additional features or functionality. For example, the computing device 600 may also include additional data storage devices (removable and/or non-removable) such as, for example, magnetic disks, optical disks, or tape. Such additional storage is illustrated in FIG. 6 by removable storage 609 and non-removable storage 610. Computer readable storage media may include volatile and nonvolatile, removable and non-removable media implemented in any method or technology for storage of information, such as computer readable instructions, data structures, program modules, or other data. System memory 604, removable storage 609 and non-removable storage 610 are all examples of computer readable storage media. Computer readable storage media includes, but is not limited to, RAM, ROM, EEPROM, flash memory or other memory technology, CD-ROM, digital versatile disks (DVD) or other optical storage, magnetic tape, magnetic disk storage or other magnetic storage devices, or any other medium which can be used to store the desired information and which can be accessed by computing device 600. Any such computer readable storage media may be part of computing device 600. Computing device 600 may also have input device(s) 612 such as keyboard, mouse, pen, voice input device, touch input device, an optical capture device for detecting gestures, and comparable input devices. Output device(s) 614 such as a display, speakers, printer, and other types of output devices may also be included. These devices are well known in the art and need not be discussed at length here.

Computing device 600 may also contain communication connections 616 that allow the device to communicate with other devices 618, such as over a wired or wireless network in a distributed computing environment, a satellite link, a cellular link, a short-range network, and comparable mechanisms. Other devices 618 may include computer device(s) that execute communication applications, web servers, and comparable devices. Communication connection(s) 616 is one example of communication media. Communication media can include therein computer readable instructions, data structures, program modules, or other data. By way of example, and not limitation, communication media includes wired media such as a wired network or direct-wired connection, and wireless media such as acoustic, RF, infrared and other wireless media.

Example embodiments also include methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

Figure 7:
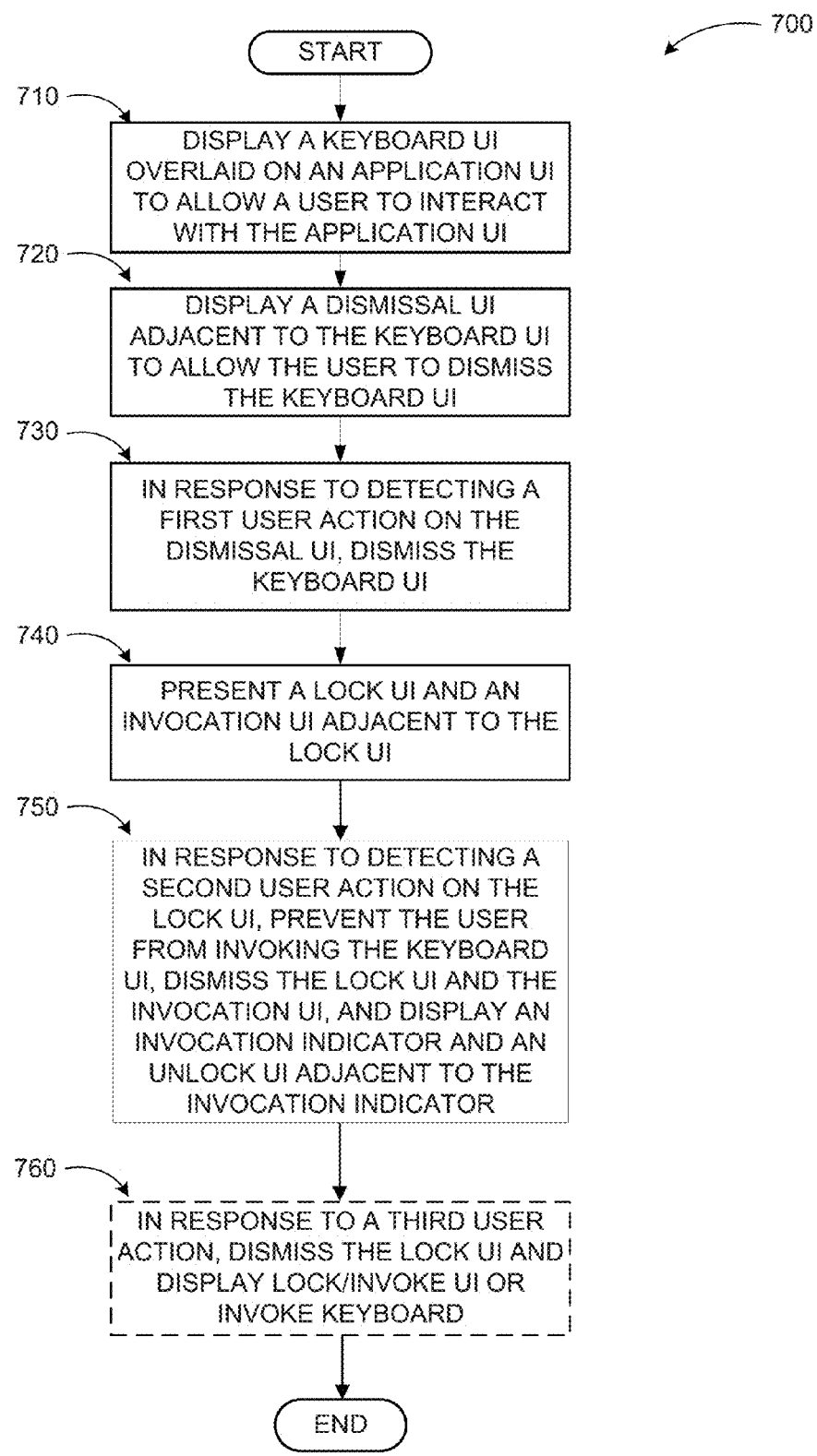
FIG. 7 illustrates a logic flow diagram for a process to provide invocation control over a keyboard UI according to embodiments.

FIG. 7 illustrates a logic flow diagram for a process to provide invocation control over a keyboard UI, according to embodiments. Process 700 may be implemented on a touch-based device.

Process 700 begins with operation 710 displaying a keyboard UI overlaid on an application UI to allow a user to interact with the application UI. Next, at operation 720, a dismissal UI may be displayed adjacent to the keyboard UI to allow the user to dismiss the keyboard UI. In response to detecting a first user action on the dismissal UI, the keyboard UI may be dismissed at operation 730. A lock UI and an invocation UI adjacent to the lock UI may be presented at operation 740.

At operation 750, in response to detecting a second user action on the lock UI, the user may be locked from invoking the keyboard UI, the lock UI and the invocation UI may be dismissed, and an invocation indicator and an unlock UI adjacent to the invocation indicator may be displayed. At optional operation 760, a third user action on the unlock UI may dismiss the unlock UI and either display the lock and invoke UI again or automatically invoke the keyboard since it has now been unlocked.

The operations included in process 700 are for illustration purposes. An application as discussed above may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method executed on a computing device to provide invocation control over a keyboard user interface (UI), the method comprising:
    displaying a keyboard UI overlaid on an application UI to allow an interaction with the application UI;
    displaying a dismissal UI adjacent to the keyboard UI to allow a dismissal of the keyboard UI;
    in response to detecting a first user action on the dismissal UI, dismissing the keyboard UI;
    presenting a lock UI and an invocation UI adjacent to the lock UI; and
    in response to detecting a second user action on the lock UI,
        preventing an invocation of the keyboard UI,
        dismissing the lock UI and the invocation UI,
        displaying an invocation indicator and an unlock UI adjacent to the invocation indicator; and
    disabling the dismissal UI, the invocation UI, the lock UI, and the unlock UI in response to detecting one or more of a disabling of the touch enablement of the application UI, an attachment of an input device, and receipt of an input from the input device.

2. The method of claim 1, further comprising:
    placing the dismissal UI adjacent to a top edge of the keyboard UI; and
    placing a right edge of the dismissal UI in line with a right edge of the keyboard UI.

3. The method of claim 1, further comprising:
    executing an operation including at least one from a set of: hiding the keyboard UI, deactivating the keyboard UI, and removing the keyboard UI to dismiss the keyboard UI.

4. The method of claim 1, further comprising:
    placing the keyboard UI in an unlocked state to allow the invocation of the keyboard UI subsequent to dismissing the keyboard UI.

5. The method of claim 1, further comprising:
    invoking the keyboard UI in response to detecting another user action in an area of the application UI configured for text editing.

6. The method of claim 1, further comprising:
    invoking the keyboard UI in response to detecting another user action on the invocation UI including at least one from a set of: a tap action and an upward swipe action.

7. The method of claim 1, further comprising:
    changing an unlocked status of the keyboard UI to a locked status to prevent the user from invoking the keyboard UI in at least one from a set of: the application UI and a desktop UI.

8. The method of claim 1, further comprising:
    sliding the lock UI in a lateral direction in response to a swipe action as the second user action; and
    sliding the lock UI back to an original position in response to activation of the lock UI.

9. The method of claim 1, further comprising:
    displaying a graphic alerting about a locked status of the keyboard UI within the invocation indicator.

10. The method of claim 1, further comprising:
    unlocking the keyboard UI in response to detecting another user action on the unlock UI.

11. The method of claim 10, further comprising:
    displaying the invocation UI and the lock UI in response to unlocking the keyboard UI.

12. A computing device to provide invocation control over a keyboard user interface (UI), the computing device comprising:
    a memory;
    a processor coupled to the memory, the processor executing an application in conjunction with instructions stored in the memory, wherein the application is configured to:
        display a keyboard UI overlaid on an application UI to allow an interaction with the application UI;
        display a dismissal UI adjacent to the keyboard UI to allow a dismissal of the keyboard UI;
        in response to detecting a first user action on the dismissal UI, dismiss the keyboard UI;
        present a lock UI and an invocation UI adjacent to the lock UI in proximity to a bottom corner of a display application UI;
        in response to detecting a second user action on the lock UI,
            prevent an invocation of the keyboard UI,
            dismiss the lock UI and the invocation UI, and
            display an invocation indicator and an unlock UI adjacent to the invocation indicator in proximity to the bottom corner of the display application UI; and
        disable the dismissal UI, the invocation UI, the lock UI, and the unlock UI in response to detecting one or more of a disabling of the touch enablement of the application UI, an attachment of an input device, and receipt of an input from the input device.

13. The computing device of claim 12, wherein the application is further configured to:
    detect a predetermined number of consequent activations of the dismissal UI; and
    provide a notification describing the lock UI and the unlock UI to enable an activation of the lock UI and the unlock UI.

14. The computing device of claim 12, wherein the application is further configured to:
    display a button control in place of the dismissal UI, the invocation UI, the lock UI, and the unlock UI; and
    change a graphic associated with the button control to reflect one from a set of: an unlocked status and a locked status of the keyboard UI.

15. The computing device of claim 12, wherein the application is further configured to:
    swap a location of the lock UI and the invocation UI; and
    swap another location of the invocation indicator and the unlock UI.

16. The computing device of claim 12, wherein the application is further configured to:
    provide control of the dismissal UI, the invocation UI, the lock UI, and the unlock UI through an application user interface (API).

17. A non-transitory computer-readable memory device with instructions stored thereon to provide invocation control over a keyboard user interface (UI), the instructions comprising:
    displaying a keyboard UI overlaid on an application UI to allow an interaction with the application UI;
    displaying a dismissal UI adjacent to the keyboard UI to allow a dismissal of the keyboard UI;
    in response to detecting a first user action on the dismissal UI, dismissing the keyboard UI;
    presenting a lock UI and an invocation UI adjacent to the lock UI in proximity to a predefined location on the application UI;

in response to detecting a second user action on the lock UI,
  preventing an invocation of the keyboard UI,
  dismissing the lock UI and the invocation UI, and
  displaying an invocation indicator and an unlock UI adjacent to the invocation indicator in proximity to the predefined location on the application UI;
providing control of the dismissal UI, the invocation UI, the lock UI, and the unlock UI through an application programming interface (API); and
disabling the dismissal UI, the invocation UI, the lock UI, and the unlock UI in response to detecting one or more of a disabling of the touch enablement of the application UI, an attachment of an input device, and receipt of an input from the input device.

18. The non-transitory computer-readable memory device of claim 17, wherein the instructions further comprise:
  placing the keyboard UI in an unlocked state to allow an invocation of the keyboard UI subsequent to dismissing the keyboard UI; and
  invoking the keyboard UI in response to detecting another user action in an area of the application UI configured to edit text.

19. The non-transitory computer-readable memory device of claim 17, wherein the instructions further comprise:
  placing the keyboard UI in an unlocked state to allow an invocation of the keyboard UI subsequent to dismissing the keyboard UI; and
  invoking the keyboard UI in response to detecting another user action on the invocation UI including at least one from a set of: a tap action and an upward swipe action.

* * * * *